United States Patent
Piergiovanni et al.

(10) Patent No.: US 12,445,677 B2
(45) Date of Patent: Oct. 14, 2025

(54) SMALL AND FAST VIDEO PROCESSING NETWORKS VIA NEURAL ARCHITECTURE SEARCH

(71) Applicant: Google LLC, Mountain View, CA (US)

(72) Inventors: Anthony J. Piergiovanni, Mountain View, CA (US); Anelia Angelova, Sunnyvale, CA (US); Michael Sahngwon Ryoo, Rocky Point, NY (US)

(73) Assignee: GOOGLE LLC, Mountain View, CA (US)

( * ) Notice: Subject to any disclaimer, the term of this patent is extended or adjusted under 35 U.S.C. 154(b) by 971 days.

(21) Appl. No.: 17/620,451

(22) PCT Filed: Sep. 16, 2020

(86) PCT No.: PCT/US2020/051027
§ 371 (c)(1),
(2) Date: Dec. 17, 2021

(87) PCT Pub. No.: WO2021/055442
PCT Pub. Date: Mar. 25, 2021

(65) Prior Publication Data
US 2022/0366257 A1 Nov. 17, 2022

Related U.S. Application Data

(60) Provisional application No. 62/902,107, filed on Sep. 18, 2019.

(51) Int. Cl.
*G06N 3/04* (2023.01)
*G06F 18/21* (2023.01)
(Continued)

(52) U.S. Cl.
CPC ..... *H04N 21/44008* (2013.01); *G06F 18/217* (2023.01); *G06N 3/04* (2013.01);
(Continued)

(58) Field of Classification Search
CPC ...... G06V 10/82; G06V 20/40; G06F 18/217; G06N 3/04; G06N 3/063; G06N 3/082
See application file for complete search history.

(56) References Cited

U.S. PATENT DOCUMENTS

| | | | |
|---|---|---|---|
| 10,984,245 B1* | 4/2021 | Tran | G06F 18/2111 |
| 2018/0018555 A1 | 1/2018 | Wong et al. | |
| 2020/0104726 A1* | 4/2020 | Alvelda, VII | G06N 5/04 |

FOREIGN PATENT DOCUMENTS

CN 109993774 7/2019

OTHER PUBLICATIONS

Chan et al., "Learning Network Architectures of Deep CNNs under Resource Constraints", Conference on Computer Vision and Patter Recognition Workshops, IEEE/CVF, 2018, Lexington, MA, 8 pages.
(Continued)

*Primary Examiner* — Li Wu Chang
(74) *Attorney, Agent, or Firm* — DORITY & MANNING P.A.

(57) ABSTRACT

Generally, the present disclosure is directed to a neural architecture search process for finding small and fast video processing networks for understanding of video data. The neural architecture search process can automatically design networks that provide comparable video processing performance at a fraction of the computational and storage cost of larger existing models, thereby conserving computing resources such as memory and processor usage.

19 Claims, 7 Drawing Sheets

(51) Int. Cl.
G06N 3/063 (2023.01)
G06N 3/082 (2023.01)
G06V 10/82 (2022.01)
G06V 20/40 (2022.01)
H04N 21/44 (2011.01)

(52) U.S. Cl.
CPC ............. *G06N 3/063* (2013.01); *G06N 3/082* (2013.01); *G06V 10/82* (2022.01); *G06V 20/40* (2022.01)

(56) References Cited

OTHER PUBLICATIONS

Kwasigroch et al., "Deep Neural Network Architecture Search Using Network Morphism", International Conference on Methods and Models in Automation and Robotics, IEEE, 2019, 6 pages.
Machine Translated Chinese Search Report Corresponding to Application No. 2020800482633 on Aug. 20, 2024.
Alwassel et al., "Action Search: Spotting Actions in Videos and Its Application to Temporal Action Localization", arXiv:1706.04269v2, Jul. 27, 2018, 16 pages.
Carreira et al., "Massively Parallel Video Networks", arXiv:1806.03863v2, Sep. 5, 2018, 27 pages.
Carreira et al., "Quo Vadis, Action Recognition? A New Model and the Kinetics Dataset", arXiv:1705.07750v3, Feb. 12, 2018, 10 pages.
Chen et al., "Multi-Fiber Networks for Video Recognition", arXiv:1807.11195v3, Sep. 18, 2018, 16 pages.
Diba et al., "Large Scale Holistic Video Understanding", arXiv:1904.11451v3, Dec. 15, 2020, 23 pages.
Diba et al., "Spatio-Temporal Channel Correlation Networks for Action Classification", arXiv:1806.07754v3, Feb. 7, 2019, 16 pages.
Fan et al., "More Is Less: Learning Efficient Video Representations by Big-Little Network and Depthwise Temporal Aggregation", arXiv:1912.00869v1, Dec. 2, 2019, 11 pages.
Feichtenhofer et al., "SlowFast Networks for Video Recognition", arXiv:1812.03982v3, Oct. 29, 2019, 10 pages.
Feichtenhofer et al., "X3D: Expanding Architectures for Efficient Video Recognition", arXiv:2004.04730v1, Apr. 9, 2020, 14 pages.
Filpe et al., "Fast-DENSER++: Evolving Fully-Trained Deep Artificial Neural Networks", arXiv:1905.02969v1, May 8, 2019, 6 pages.
Goldberg et al., "A Comparative Analysis of Selection Schemes Used in Genetic Algorithms", arXiv:1812.03443v3, May 24, 2019, 10 pages.
Guo et al., "An Efficient 3D-NAS Method for Video-Based Gesture Recognition", Lecture Notes in Computer Science, vol. 11729, Springer International, 2019, 12 pages.
Han Cai et al., "ProxylessNAS: Direct Neural Architecture Search on Target Task and Hardware", 1812.00332v2, Feb. 23, 2019, 13 pages.
Hara et al., "Can Spatiotemporal 3D CNNs Retrace the History of 2D CNNs and ImageNet?", arXiv:1711.09577v2, Apr. 2, 2018, 10 pages.
He et al., "AMC: AutoML for Model Compression and Acceleration on Mobile Devices", arXiv:1802.03494v4, Jan. 16, 2019, 17 pages.
Howard et al., "Searching for MobileNetV3", arXiv:1905.02244v5, Nov. 20, 2019, 11 pages.
Hu et al., "Squeeze-and-Excitation Networks", arXiv:1709.01507v4, May 16, 2019, 13 pages.
Hussein et al., "Timeception for Complex Action Recognition", arXiv:1812.01289v2, Apr. 28, 2019, 10 pages.
International Preliminary Report on Patentability for Application No. PCT/US2020/051027, mailed Mar. 31, 2022, 11 pages.
Ji et al., "3D Convolutional Neural Networks for Human Action Recognition", IEEE Transactions on Pattern Analysis and Machine Intelligence, 35(1):221-231, 2013, 8 pages.
Korbar et al., "SC Sampler: Sampling Salient Clips from Video for Efficient Action Recognition", arXiv:1904.04289v2, Aug. 30, 2019, 14 pages.
Kuehne et al., "HMDB: A Large Video Database for Human Motion Recognition", ICCV. IEEE, 2011, 8 pages.
Lee et al., "Motion Feature Network: Fixed Motion Filter for Action Recognition", arXiv:1807.10037v2, Aug. 1, 2018, 17 pages.
Lin et al., "TSM: Temporal Shift Module for Efficient Video Understanding", arXiv:1811.08383v3, Aug. 22, 2019, 13 pages.
Liu et al., "DARTS: Differentiable Architecture Search", arXiv:1806.09055v2, Apr. 23, 2019, 13 pages.
Liu et al., "Progressive Neural Architecture Search", arXiv:1712.00559v3, Jul. 26, 2018, 20 pages.
Luo et al., "Grouped Spatial-Temporal Aggregation for Efficient Action Recognition", arXiv:1909.13130v1, Sep. 28, 2019.
Luo et al., "ThiNet: A Filter Level Pruning Method for Deep Neural Network Compression", arXiv:1707.06342v1, Jul. 20, 2017, 9 pages.
Miech et al., "Learnable Pooling with Context Gating for Video Classification", arXiv:1706.06905v2, Mar. 5, 2018, 8 pages.
Monfort et al., "Moments in Time Dataset: One Million Videos for Event Understanding", arXiv:1801.03150v3, Feb. 16, 2019, 8 pages.
Pham et al., "Efficient Neural Architecture Search via Parameter Sharing", arXiv:1802.03268v2, Feb. 12, 2018, 11 pages.
Piergiovanni et al., "Evolving Space-Time Neural Architectures for Videos", arXiv:1811.10636v2, Aug. 20, 2019, 18 pages.
Piergiovanni et al., "Fine-grained Activity Recognition in Baseball Videos", CVPR Workshop on Computer Vision in Sports, 2018, 9 pages.
Piergiovanni et al., "Learning Latent Sub-events in Activity Videos Using Temporal Attention Filters", arXiv:1605.08140v3, Dec. 26, 2016, 8 pages.
Piergiovanni et al., "Tiny Video Networks", arXiv:1910.06961v3, Jun. 30, 2021, 11 pages.
Qiu et al., "Learning Spatio-Temporal Representation with Pseudo-3D Residual Networks", arXiv:1711.10305v1, Nov. 28, 2017, 9 pages.
Real et al., "Large-Scale Evolution of Image Classifiers", arXiv:1703.01041v2, Jun. 11, 2017, 18 pages.
Real et al., "Regularized Evolution for Image Classifier Architecture Search", arXiv:1802.01548v7, Feb. 16, 2019, 16 pages.
Ryoo et al., "AssembleNet: Searching for Multi-Stream Neural Connectivity in Video Architectures", arXiv:1905.13209v4, May 27, 2020, 15 pages.
Ryoo et al., "AssembleNet++: Assembling Modality Representations via Attention Connections", arXiv:2008.08072v1, Aug. 18, 2020, 19 pages.
Sandler et al., "MobileNetV2: Inverted Residuals and Linear Bottlenecks", arXiv:1801.04381v4, Mar. 21, 2019, 14 pages.
Sigurdsson et al., "Asynchronous Temporal Fields for Action Recognition", arXiv:1612.06371v2, Jul. 24, 2017, 20 pages.
Sigurdsson et al., "Hollywood in Homes: Crowdsourcing Data Collection for Activity Understanding", arXiv:1604.01753v3, Jul. 26, 2016, 17 pages.
Simonyan et al., "Two-Stream Convolutional Networks for Action Recognition in Videos", arXiv:1406.2199v2, Nov. 12, 2014, 11 pages.
Su et al., "Leaving Some Stones Unturned: Dynamic Feature Prioritization for Activity Detection in Streaming Video", arXiv:1604.00427v1, Apr. 1, 2016, 13 pages.
Sun et al., "Optical Flow Guided Feature: A Fast and Robust Motion Representation for Video Action Recognition", arXiv:1711.11152v2, Jul. 7, 2018, 10 pages.
Tan et al., "EfficientNet: Rethinking Model Scaling for Convolutional Neural Networks", arXiv:1905.11946v5, Sep. 11, 2020, 11 pages.
Tan et al., "MnasNet: Platform-Aware Neural Architecture Search for Mobile" arXiv:1807.11626v3, May 29, 2019, 9 pages.
Tran et al., "C3D: Generic Features for Video Analysis", arXiv:1412.0767v1, Dec. 2, 2014, 10 pages.
Wang et al., "Non-local Neural Networks", arXiv:1711.07971v3, Apr. 13, 2018, 10 pages.

(56) References Cited

OTHER PUBLICATIONS

Wang et al., "Temporal Segment Networks: Towards Good Practices for Deep Action Recognition", arXiv:1412.0767v1, Dec. 2, 2014, 10 pages.
Wofk et al., "FastDepth: Fast Monocular Depth Estimation on Embedded Systems", arXiv:1903.03273v1, Mar. 8, 2019, 8 pages.
Wu et al., "AdaFrame: Adaptive Frame Selection for Fast Video Recognition", arXiv:1811.12432v2, Apr. 10, 2019, 10 pages.
Wu et al., "Compressed Video Action Recognition", arXiv:1712.00636v2, Mar. 29, 2018, 14 pages.
Wu et al., "Fbnet: Hardware-aware Efficient Convnet Design via Differentiable Neural Architecture Search", arXiv:1812.03443v3, May 24, 2019, 10 pages.
Wu et al., "SCSampler: Sampling Salient Clips from Video for Efficient Action Recognition", arXiv:1904.04289v2, Aug. 30, 2019, 14 pages.
Xie et al., "Rethinking Spatiotemporal Feature Learning: Speed-Accuracy Trade-offs in Video Classification", arXiv:1712.04851v2, Jul. 27, 2018, 17 pages.
Xiong et al., "Resource Constrained Neural Network Architecture Search: Will a Submodularity Assumption Help?", arXiv:1904.03786v2, Sep. 4, 2019, 10 pages.
Yang et al., "NetAdapt: Platform-Aware Neural Network Adaptation for Mobile Applications", arXiv:1804.03230v2, Sep. 28, 2018, 16 pages.
Yeung et al., "Every Moment Counts: Dense Detailed Labeling of Actions in Complex Videos", arXiv:1507.05738v3, Jun. 9, 2017, 15 pages.
Zhang et al., "ShuffleNet: An Extremely Efficient Convolutional Neural Network for Mobile Devices", arXiv:1707.01083v2, Dec. 7, 2017, 9 pages.
Zhou et al., "Resource-Efficient Neural Architect", arXiv:1806.07912v1, Jun. 12, 2018, 14 pages.
Zhu et al., "EENA: Efficient Evolution of Neural Architecture", arXiv:1905.07320v3, Aug. 27, 2019, 9 pages.
Zolfaghari et al., "ECO: Efficient Convolutional Network for Online Video Understanding", arXiv:1804.09066v2, May 7, 2018, 24 pages.
Zoph et al., "Neural Architecture Search with Reinforcement Learning", arXiv:1611.01578v2, Feb. 15, 2017, 16 pages.

* cited by examiner

SMALL AND FAST VIDEO PROCESSING NETWORKS VIA NEURAL ARCHITECTURE SEARCH

RELATED APPLICATIONS

This application is based upon and claims the right of priority under 35 U.S.C. § 371 to International Application No. PCT/US2020/051027 filed on Sep. 16, 2020 which claims priority to and the benefit of U.S. Provisional Patent Application No. 62/902,107, filed Sep. 18, 2019. Applicant claims priority to and the benefit of each of such applications and incorporates all such applications herein by reference in their entirety.

FIELD

The present disclosure relates generally to neural networks. More particularly, the present disclosure relates to a neural architecture search process for finding small and fast video processing networks for understanding of video data.

BACKGROUND

Artificial neural networks (also referred to simply as "neural networks") are a class of machine-learned models that are especially powerful, accurate, or otherwise high-performing for various tasks. An artificial neural network can include a group of connected nodes, which can also be referred to as (artificial) neurons or perceptrons. An artificial neural network can be organized into one or more layers. Artificial neural networks that include multiple layers can be referred to as "deep" networks.

Example artificial neural networks include feed-forward neural networks, recurrent neural networks, convolutional neural networks, other forms of artificial neural networks, or combinations thereof. Each of these example types has different internal structures or "architectures" that enable, in part, the particular benefits provided by that type of artificial neural network. For example, the architecture of an artificial neural network can correspond to or include the structure, arrangement, number, types, behavior, operations performed by, and/or other properties of the neurons or layers of neurons included in the network.

One example application of neural networks includes performance of tasks related to the understanding of videos. In particular, video understanding is an important problem in computer vision with many applications, such as automated video tagging, activity recognition, and robot perception.

Video understanding tasks require processing both spatial (image) and temporal information and are therefore highly challenging. As such, achieving state-of-the-art results on video recognition tasks currently requires the use of extremely large networks which often include tens to hundreds of convolutional layers and which look at hundreds of frames of the video to produce a prediction. Specifically, existing network architectures for video understanding typically incorporate computationally intensive modules such as, for example, 3D convolutions, non-local blocks, and others. As a result, the networks often suffer from very slow runtimes e.g., requiring at least 500+ ms per video snippet on a contemporary GPU and 2000+ ms on a CPU. Using such expensive networks greatly hinders their application to real-world systems, e.g., in robotics, mobile devices, edge or embedded devices, or other resource-constrained environments in which memory and/or compute is very limited.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method of neural architecture search for video understanding. The method includes defining, by a computing system comprising one or more computing devices, a plurality of searchable parameters that control an architecture of a video processing neural network, wherein the video processing neural network is configured to process video data to produce inferences. The method includes, for one or more iterations: determining, by the computing system, a new set of values for the plurality of searchable parameters to generate a new architecture for the video processing neural network. The method includes, for one or more iterations: determining, by the computing system, whether the video processing neural network with the new architecture satisfies one or more constraints on a size of the video processing neural network or a runtime of the video processing neural network. When the video processing neural network with the new architecture does not satisfy the one or more constraints: the method includes discarding, by the computing system, the new architecture prior to completion of training of the video processing neural network with the new architecture. When the video processing neural network with the new architecture satisfies the one or more constraints: the method includes training, by the computing system, the video processing neural network with the new architecture on a set of video training data; and evaluating, by the computing system, one or more performance metrics for the video processing neural network relative to production of inferences for video evaluation data.

Another example aspect of the present disclosure is directed to a computer-implemented method. The method includes defining, by one or more computing devices, a plurality of searchable parameters for an architecture of a video processing neural network. The method includes, for each of a plurality of iterations: modifying, by one or more computing devices, at least one of the searchable parameters to generate a new architecture for the video processing neural network; and determining, by the computing system, whether the video processing neural network with the new architecture satisfies one or more constraints on a size of the video processing neural network or a runtime of the video processing neural network.

Another example aspect of the present disclosure is directed to a computer-implemented method. The method includes defining, by one or more computing devices, a plurality of searchable parameters for an architecture of a neural network. The method includes, for each of a plurality of iterations: modifying, by one or more computing devices, at least one of the searchable parameters to generate a new architecture for the neural network; and determining, by the computing system, whether the neural network with the new architecture satisfies one or more constraints on a size of the neural network or a runtime of the neural network.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
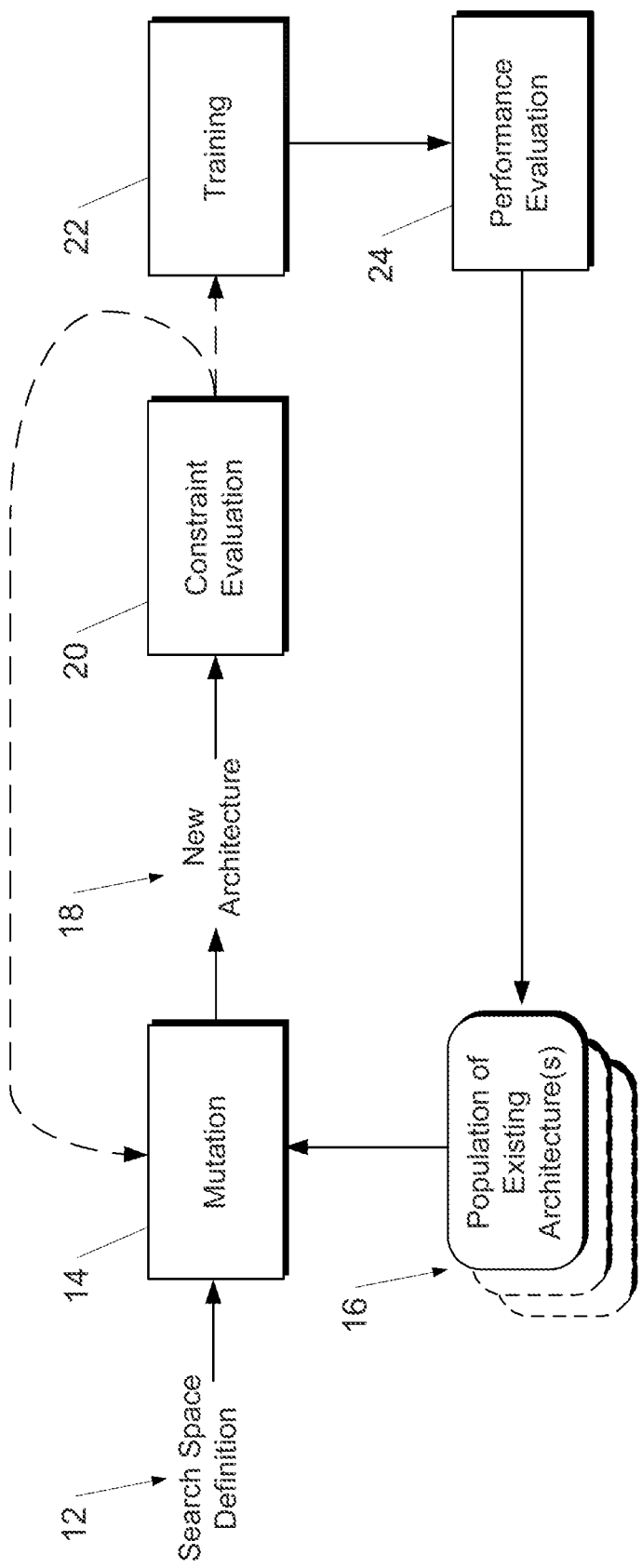
FIG. 1A depicts a graphical diagram of an example evolutionary learning approach to neural architecture search according to example embodiments of the present disclosure.

Reference numerals that are repeated across plural figures are intended to identify the same features in various implementations.

DETAILED DESCRIPTION

Overview

Generally, the present disclosure is directed to a neural architecture search process for finding small and fast video processing networks for understanding of video data. The neural architecture search process can automatically design networks that provide comparable video processing performance at a fraction of the computational and storage cost of larger existing models, thereby conserving computing resources such as memory and processor usage.

More particularly, one developing field of study is that of neural architecture search. Neural architecture search uses the principles and techniques of machine learning to automate or "learn" the design of new artificial neural network architectures. In particular, as examples, neural architecture search techniques may seek to automate the specification and discovery of entire neural network topologies, activation functions, gradient update rules, and/or many other complex details that underlie state-of-the-art deep learning architectures. These efforts assume various names in addition to neural architecture search, including "learning to learn," "AutoML," "meta-learning," or the like.

Existing neural architecture search techniques often work by iteratively searching within a search space that defines the bounds of the search. For example, a search technique can include iteratively sampling architectures within the search space to generate new architectures. Generally, the speed with which a neural architecture search can be performed is, at least in part, a function of the size of its search space. That is, a larger search space includes a larger number of possible permutations which will take longer to search, while a smaller search space will be faster to search.

Yet, none of the prior approaches in this field have addressed building efficient architectures for videos. The main reasons are that videos are content-heavy and therefore each video requires a significant amount of processing by the network to produce an inference. Therefore, the training and evaluation of each proposed network architecture requires a large amount of computational effort, causing the application of architecture search to networks for video understanding to be a highly time-intensive process. As such, the application of neural architecture search to videos is non-trivial, and in many cases computationally prohibitive.

The present disclosure overcomes these challenges. In particular, the present disclosure provides a general architecture search approach which designs a family of 'tiny' neural networks for video understanding. The architecture search can be performed (e.g., a search objective can be optimized) using various different learning/optimization strategies, including both evolutionary learning and reinforcement learning.

Specifically, the proposed architecture search can be implemented as an iterative process in which new architectures are iteratively proposed from within a defined search space. For example, the search space can define or include a number of searchable parameters. The searchable parameters can control an architecture of a neural network, such as a video processing neural network that is configured to process video data to produce inferences. Example searchable parameters are described elsewhere herein but can generally include, as examples, a number of blocks, a number of layers within each block, a number of repetitions of each block, a type of each layer (e.g., an operation type performed by the layer), etc. As another example which is unique to the present disclosure, the searchable parameters can include parameters that control an input size of the video data. For example, the input size of the video data can include a spatial resolution of the video data, a number of frames to sample from the video data, a frame rate of the video data, and/or the like. Thus, the search process can include searching for an optimal input size for the video data (e.g., which may be domain, task, and/or dataset specific).

According to an aspect of the present disclosure, the automated search process can include, at each iteration, application of one or more constraints to the new architecture that is proposed at such iteration. For example, the constraint(s) can include constraints on a size of the video processing neural network or a runtime of the video processing neural network. If the proposed architecture does not satisfy the constraint(s), it can be discarded prior to completion of training of the network. However, if the proposed architecture does satisfy the constraint(s), it can be trained and evaluated (e.g., for consideration for addition to a population of evolutionarily derived architectures or to enable production of a reward or other feedback signal which can be used to train a controller configured to generate the new architecture at each addition).

The application of constraint(s) as described herein has multiple benefits. As one example, the network architectures that are ultimately produced by the search process comply with the constraint(s). Stated differently, if constraint(s) are applied which require that the networks be fast and/or small/lightweight, then the search process will find architectures that provide optimal performance (e.g., high accuracy) while still being fast and/or small/lightweight (i.e., satisfying the constraint(s)). Thus, application of the constraint(s) directly results in identification of network architectures that are, for example, fast and lightweight.

However, as another example benefit, application of the constraint(s) as described herein significantly reduces the computational requirements of performing the architecture search process itself. More particularly, as described above, videos are content-heavy and therefore each video requires a significant amount of processing by the network to produce an inference. Therefore, the training and evaluation of each proposed network architecture requires a large amount of computational effort, causing the application of architecture search to networks for video understanding to be a highly time-intensive (often computationally prohibitive) process. The application of constraint(s) as described herein assists in overcoming this challenge in two ways.

First, application of the constraint(s) prior to completion of training (e.g., prior to initiation of training and/or during training such as at the initial rounds of training) can serve as a pre-filter which prevents resources from being expended on training and evaluating network architectures that are unsuitable. Stated differently, if a network architecture violates a constraint, it can be discarded without the search system expending resources on training and evaluating such architecture. As such, the use of constraint(s) as a pre-filter in such manner can greatly reduce the number of candidate architectures that are trained and evaluated, thereby greatly reducing the computational burden of the search process as a whole.

Secondly, the architectures that are ultimately trained and evaluated are those that comply with the constraint(s). Stated differently, if constraint(s) are applied that require the architecture to be small and/or fast, then the training and evaluation of the architectures that satisfy such constraint(s) will also be small and/or fast. Thus, even for those architectures that are ultimately trained and evaluated, the computational burden can be reduced relative to the burden associated with training and evaluation of a general distribution of network architectures throughout the search space.

Thus, the proposed systems and methods can be used to produce small and fast video architectures. Specifically, example resulting networks achieve competitive accuracy and run efficiently, at real-time or better speeds, within 37 to 100 ms on a CPU and 10 ms on a GPU per ~1 second video clip, achieving hundreds time faster speeds than contemporary models. As such, example networks designed according to the techniques described herein can be referred to as Tiny Video Networks (TVN), as they require extremely small runtimes, which is unprecedented for video models. Creating such fast networks opens up the opportunity both for deployment in real-life applications, e.g. online robotics systems, mobile phones, edge or embedded devices, etc, as well as, for research development. Furthermore, the search process itself is also efficient and does not require excessive computational resources.

The present disclosure provides a number of contributions. As one example, the present disclosure provides the first approach in the field to learn highly efficient networks for videos (Tiny Video Networks). These are the fastest video networks known and run on CPU and GPU with better than real-time speeds. As another example contribution, the present disclosure provides an architecture search which is designed to address the challenges of working with videos and at the same time producing fast and accurate models. As yet another example, the tiny models identified by the techniques described herein can further be scaled up to obtain the fastest models which work comparably to the state-of-the-art performance. Furthermore, the proposed approach allows for more explorations in video architectures, at very low cost. Which will also allow for future video architecture work to be much more efficient and less computationally burdensome.

U.S. Provisional Patent Application No. 62/902,107 includes example experimental results on four popular datasets for video understanding: Moments in time, HMDB, Charades, and MLB-YouTube. For all datasets, the example implementations described in U.S. Provisional Patent Application No. 62/902,107 obtain results comparable, or slightly lower than the state-of-the-art at a fraction of the runtime. For example, the example experimental results demonstrate that the example Tiny Video Networks described therein operate in the area of the accuracy-runtime curve where no other models exist.

The present disclosure provides a number of technical effects and benefits. As one example, the systems and methods of the present disclosure are able to generate new neural architectures much faster and using much fewer computing resources (e.g., less processing power, less memory usage, less power consumption, etc.), for example as compared to naive search techniques which search the entire search space. As another result, the systems and methods of the present disclosure are able to generate new neural architectures that are better suited for resource-constrained environments, for example as compared to search techniques which do not contain constraints on the size and/or runtime of the network. That is, the resulting neural architectures are able to be run relatively faster and using relatively fewer computing resources (e.g., less processing power, less memory usage, less power consumption, etc.), all while remaining competitive with or even exceeding the performance (e.g., accuracy) of current state-of-the-art models. Thus, as another example technical effect and benefit, the search technique described herein can automatically find significantly better models than existing approaches and achieve a new state-of-the-art trade-off between performance and runtime/size.

Thus, the present disclosure provides a novel approach for automatically learning Tiny Video Network architectures. These are the first video models that are both fast and accurate. They are automatically discovered, perform well as seen on four example datasets, and provide a good trade-off in speed vs. accuracy. The models are hundreds of times faster than contemporary video models and have fewer parameters. As such, they can be applied to real-time robotics applications and run on mobile devices.

Although aspects of the present disclosure are described relative to neural networks for video processing, the architecture search systems and methods described herein are also applicable to search for neural network architectures suitable for performing various other tasks. As an example, the architecture search systems and methods described herein may provide particular benefit in identifying network architectures for any application or domain in which network training and/or inference is particularly computationally demanding.

With reference now to the Figures, example embodiments of the present disclosure will be discussed in further detail.

Example Neural Architecture Search

Instead of hand-designing an architecture, aspects of the present disclosure perform an architecture search for automatic design within a huge search space. The search process can explore building networks constrained for both runtime and number of parameters. Further, after finding architectures satisfying those requirements, the resulting networks can optionally be scaled-up to improve performance.

Example Evolutionary Search Approach

FIG. 1A depicts a graphical diagram of an example evolutionary learning approach to neural architecture search according to example embodiments of the present disclosure. The use of an evolutionary algorithm allows parallel evaluation and mutation of multiple individuals (i.e., networks) in the population, and effectively explores an irregular search space with a non-differentiable objective function, which here for example can be runtime.

More particularly, the illustrated neural architecture search can perform an architecture search within a search space 12. The search space 12 can define or contain a number of searchable parameters. Acceptable values or ranges of values can be provided for each searchable parameter. The search process can iteratively search within the search space 12 to identify optimal network architectures within the search space 12.

Design of the search space 12 can assist in answering some or all of the following key questions regarding the network architecture: What is the optimal ratio between spatial resolution (image size) and temporal resolution (number of frames)? How/where should the spatial and temporal information be downsampled? With constrained runtime, what configuration of layers provides the best performance? How deep/wide should the network be? Etc.

One example search space can follow a simple meta-architecture consisting of multiple blocks. In some implementations, the number of blocks ranges between 2 and 10 and is selected as part of the search process. In some implementations, the final block is followed by global average pooling, a dropout layer, and a fully connected layer which outputs the number of classes required for classification. See FIG. 3 for an example. In some implementations, in each block, the algorithm can select from a number of layers: spatial convolution, temporal convolution, non-local layers, context-gating layers, and squeeze-and-excitation layers.

In some implementations, for each layer, a number of parameters can be selected. As an example, for non-local layers, example searchable parameters can include the bottleneck size and/or the representation size (e.g., size after pooling). As another example, the searchable parameters can include the squeeze ratio for the squeeze-and-excitation layers. In some implementations, the convolutional layers can have a variety of kernel sizes (e.g., from 1 to 8), strides (e.g., from 1 to 8), number of filters (e.g., from 32 to 2048), and/or types (e.g., standard convolution, depthwise convolution, average pooling or max pooling). Additionally, in some implementations, each block can be repeated 1 to 8 times and the number of repetitions can be a searchable parameter. Another searchable parameter can be, for each block, whether such block has a skip/residual connection.

According to an aspect of the present disclosure, in some implementations, the search space 12 can also include one or more searchable parameters that control or vary the input size of the video data as part of the search space. As examples, some or all of the following can be searchable parameters: spatial resolution (e.g., 32×32 to 320×320), number of frames to sample (e.g., 1 to 128) and frame rate (e.g., 1 fps to 25 fps). Thus, the search process can include searching for an optimal input size for the video data (e.g., which may be domain, task, and/or dataset specific).

In applications of the illustrated technique to videos, exploring all of these potential architectures leads to a very large search space. As an example, assuming an example use of all of the example searchable parameters described above, each block has ~$2^{34}$ possible configurations. When including the input resolution and up to 8 blocks in the network, the search space has a size of ~$2^{45}$ or about ~$10^{13}$. Thus, without automated search (e.g., a brute-force grid search or random search), finding good architectures in this space is extremely difficult, especially when adding constraints such as runtime or maximum number of parameters. In fact, in certain example experiments, it was observed that many of the architectures in this space gave nearly random performance, i.e., have poor classification results, or diverge during training, or exhibit other unstable behaviors.

Having defined the search space 12, the search process can proceed on an iterative basis. As one example, a tournament selection evolutionary algorithm with discrete mutation operators can be used as the search method.

More generally, at each iteration, a mutation 14 can be performed on or relative to one or more architectures sampled from a population 16 of existing architectures. The population 16 can include any number of architectures (e.g., 1, 2, 3, 10, 50, 200, 1000, etc.). Generally, the population 16 can include the highest-performing architectures seen in previous iterations.

In some implementations, the search process can include initializing the population 16 of existing architectures. For example, since the search space 12 is large, in some examples the search process can begin by generating 200 random networks for inclusion in the population 16, many of which yield poor performance. After evaluating these networks, an iterative evaluation and selection process can be performed (e.g., the tournament selection algorithm).

As one example, at each iteration, one or more of the current population 16 of existing architectures can be sample. As one example, from a current population 16 of 200 networks, 50 can be randomly selected, and then the top performing network can be identified as a 'parent.' After one or more networks have been sampled, a mutation operation 14 can then be applied to the selected network(s) by randomly changing one or more values for one or more searchable parameters of the network(s) to produce a new architecture 18.

One example mutation operation 14 simply randomly selects one part of the network obtained from the population 16 and randomly changes it, as defined in the search space 12, thereby producing the new architecture 18. This could be the input resolution, the number of blocks, the configuration of layers within the block, and/or other searchable parameters. As indicated elsewhere herein, this evolutionary approach is highly parallelizable.

In some example implementations, in order to learn novel efficient video architecture, the search process can maximize the following equation, where the input is the set of variables/parameters defining a neural network architecture. N is the network configuration, which is defined by particular values chosen for that network for the searchable parameters of the search space 12. θ is the learnable parameters of the network (|θ| is the number of parameters in the network), and P is a hyperparameter controlling the maximum size of the network. $\mathcal{R}(N_\theta)$ computes the runtime of the network on a device, given the network N with its weight values θ, and R is the maximum desired computational runtime.

$$\underset{N_\theta}{\text{maximize}} \quad \mathcal{F}(N_\theta) \tag{1}$$

$$\text{subject to} \quad \mathcal{R}(N_\theta) < R$$
$$|\theta| < P.$$

$\mathcal{F}$ is a fitness function which measures one or more performance metrics of the network N. As one example, the fitness function can measure the accuracy of the trained network N on the validation set of a dataset. Metrics other than accuracy can be used as well, as is known in the art.

Note that this equation (1) is not differentiable due to the runtime and number of parameters constraints. While some works have tried to make runtime a differentiable operation, this requires estimating the runtime of each operation on the targeted device. However, for simplicity, an evolutionary algorithm can be used as it allows easily targeting different devices and adding constraints on the number of parameters (e.g., model size) which is important for mobile applications. Further, once the search space 12 is designed, it requires no tuning of other hyperparameters for the search, e.g., learning rate or loss scaling factors.

Referring again to FIG. 1A, in some implementations and according to an aspect of the present disclosure, prior to training 22 and/or performance evaluation 24 of the new architecture 18, the search process can first perform a constraint evaluation process 20 that determines whether the new architecture 18 satisfies one or more constraints. For example, the constraints evaluated at 20 can include the constraints described at equation (1). In some implementations, some or all of the constraint(s) can be evaluated prior to any training 22 of the new architecture 18. For example, a constraint on a number of parameters can easily be evaluated by simply analyzing the number of parameters included in the architecture 18. In some implementations, some or all of the constraints can be evaluated at the beginning or during training 22. For example, a constraint on the runtime of the new architecture 18 may require some number of initial forward passes using the network to evaluate the runtime of the network. In other implementations, the runtime of the network can be estimated (e.g., without performing any forward passes through the network) and the runtime constraint can be evaluated based on such estimation.

As described elsewhere herein, if the new architecture 18 does not satisfy the constraint(s), then it can be discarded (e.g., with little to no time spent on training 22 and/or evaluation 24). For example, if the new architecture 18 is discarded, then the search process can return to the mutation stage 14. For example, a new parent can be selected from the population 16 and mutated.

However, if the new architecture 18 does satisfy the constraint(s), then it can be trained 22 on a set of training data and then evaluated 24 on a set of evaluation data (e.g., validation data). Evaluation 24 can include assessing one or more performance metrics (e.g., the fitness function $\mathcal{F}$) for a trained model having the new architecture 18.

After evaluating the new architecture 18, it can optionally be added to the current population 16 and, for example, the lowest performing network (e.g., as measured by the performance metric(s)) can be removed from the population 16. Thereafter, the next iteration of the evolutionary search can begin (e.g., with new sampling/selection from the updated population 16).

The search process can continue for a number of rounds (e.g., approximately 1000 rounds). Alternatively, the search process can continue until certain performance thresholds are met. In some implementations, at 22, each model can be trained for 10,000 iterations, and since they are fast, the average training time is about 1.5 hours. When taking advantage of parallel training, an example implementations of the illustrated search can be done within a day.

Figure 1B:
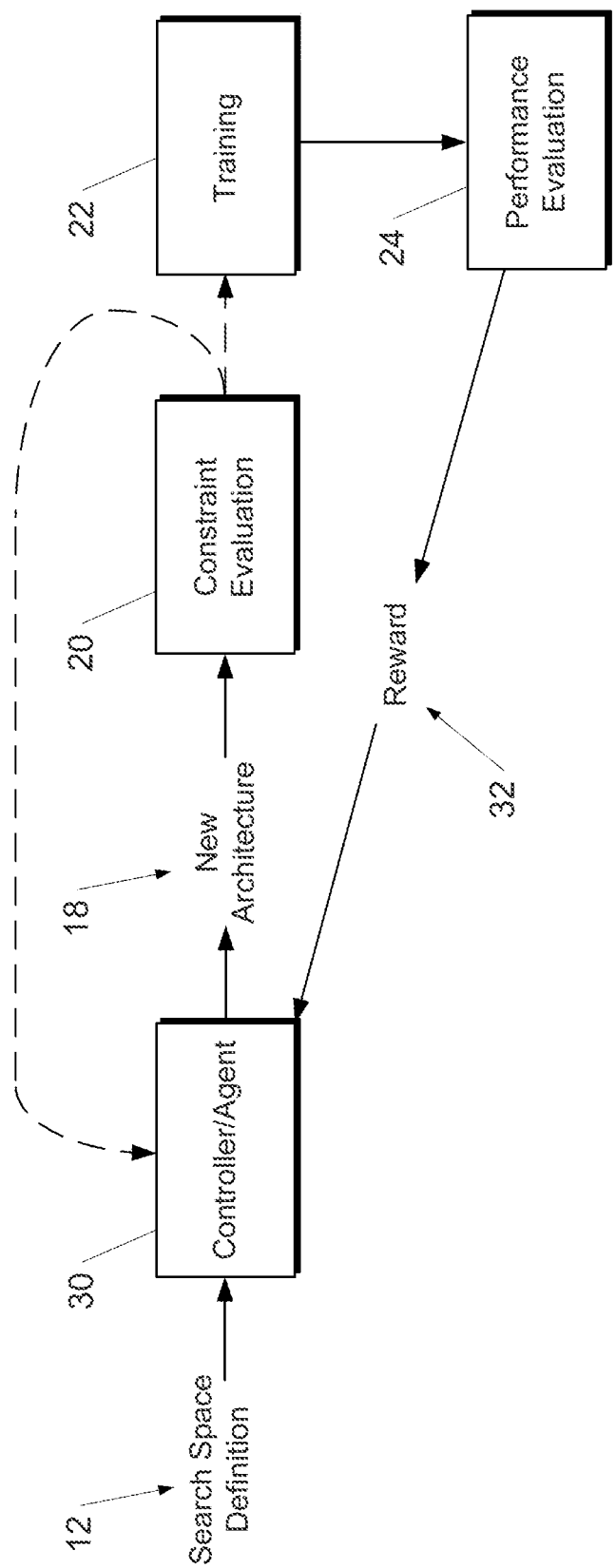
FIG. 1B depicts a graphical diagram of an example reinforcement learning approach to neural architecture search according to example embodiments of the present disclosure.

As seen in the experimental section, this algorithm discovers very efficient and at the same time accurate architectures. Also note that since each architecture considered in the search is extremely efficient to begin with, the search itself is not as computationally intensive as other neural architecture search methods Example Reinforcement Learning Approach FIG. 1B depicts a graphical diagram of an example reinforcement learning approach to neural architecture search according to example embodiments of the present disclosure. In particular, the approach illustrated in FIG. 1B can be used in addition or alternatively to the search illustrated in FIG. 1A.

The search illustrated in FIG. 1B is similar to that illustrated in FIG. 1A, except that, instead of mutations being performed to generate the new architecture 18, the reinforcement learning process shown in FIG. 1B includes a controller 30 that operates to generate (e.g., select values for) the new architecture 18.

More specifically, in some implementations, the controller 30 can act as an agent in a reinforcement learning scheme to select values for the searchable parameters of the search space 12 to generate the new architecture 18. For example, at each iteration, the controller 30 can apply a policy to select the values for the searchable parameters to generate the new architecture 18. As one example, the controller 30 can be a recurrent neural network.

The search system can use the performance metric(s) measured at evaluation 24 to determine a reward 32 to provide to the controller 30 in a reinforcement learning scheme. For example, the reward can be correlated to the performance of the architecture 18 (e.g., a better performance results in a larger reward and vice versa). At each iteration, the policy of the controller 30 can be updated based on the reward 32. As such, the controller 30 can learn (e.g., through update of its policy based on the reward 32) to produce architectures 18 that provide strong performance. In some implementations, if the architecture 18 fails the constraint evaluation 20, the controller 30 can be provided with zero reward, negative reward, or a relatively low reward.

Example Video Processing Networks
Example Video Processing Tasks

Figure 2:
FIG. 2 depicts a graphical diagram of an example video processing neural network according to example embodiments of the present disclosure.

Example network architectures identified by the proposed search process can be useful for video processing tasks. FIG. 2 illustrates an example video processing neural network 202. The video processing neural network 202 is configured to receive video data 204 and to process the video data 204 to produce one or more inferences 206.

The inference(s) 206 can be a prediction or output for any of a number of different video processing tasks. As one example, the inference can be a classification for the video as a whole or for one or more frames of the video. The classification can be a binary classification or a multi-class classification. The classification can, for example, be a multi-label classification. In some instances in which the classification is annotated to the video data 204, the classification task can be referred to as a video annotation task. As another example, the inference 206 can be a video segmentation output. For example, the segmentation output can be a pixel-level segmentation output or a frame-level segmentation output. In some instances in which the segmentation identifies certain frames as corresponding to an activity, the segmentation task can be referred to as activity detection. As another example, the inference 206 can be an inter-frame object detection (e.g., object detected within a particular portion of a frame) or a frame-wide object detection (e.g., a first frame contains a certain object but a second frame does not). Many other video understanding tasks can be performed as well, including scene understanding, depth extraction, relational learning, Visual-Question-Answering, etc.

Example Learned Architectures

Figure 3:
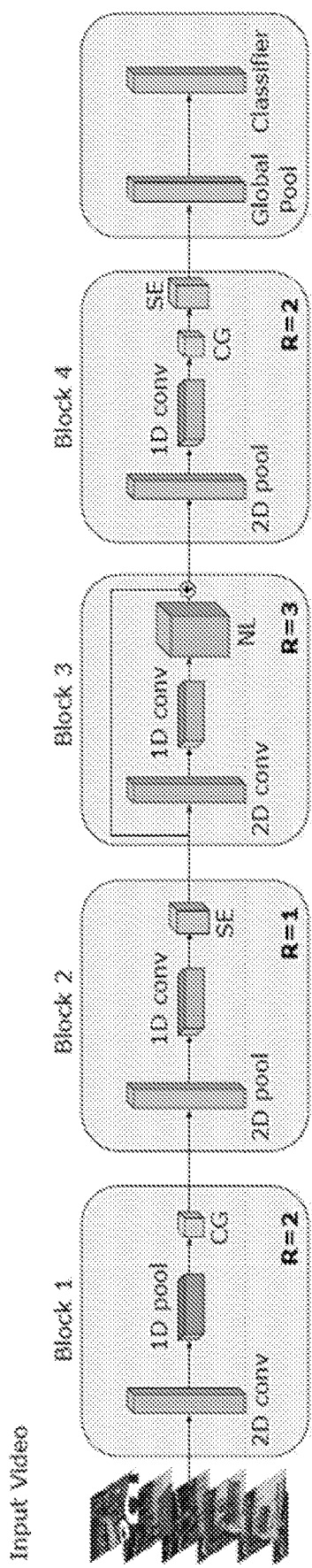
FIG. 3 depicts a graphical diagram of an example video processing neural network architecture according to example embodiments of the present disclosure.

FIG. 3 shows one example architecture (TVN-1) learned through the processes described herein. As illustrated in FIG. 3, in some examples, a Tiny Video Network can have multiple blocks, each repeated R times. Each block can have a different configuration with spatial and temporal convolution/pooling, non-local layers (NL), context gating (CG), and/or squeeze-excitation layers (SE). In some implementations, the final representation can be globally-averaged and used as input to a fully connected layer for classification.

More generally, the architectures learned by the search processes described herein have a number of interesting characteristics. As one example, surprisingly, certain of the learned model architectures are different than typical video architectures with fewer convolutional layers: certain example Tiny Video Networks prefer lightweight elements such as 2D pooling, gating layers, and squeeze-and-excitation layers. In contrast, contemporary video understanding models often include computationally intensive layers such as 3D convolutions. Interestingly, one of the popular non-local block modules is often not preferred by the tiny networks as it gains little performance for a high computation cost.

The example networks shown in U.S. Provisional Patent Application No. 62/902,107 demonstrate that naturally smaller models do have fewer parameters. However, an interesting observation is that some of the computationally efficient models have larger parameter sizes, e.g. TVN-1. Also another interesting observation is that despite TVN-3 and TVN-4 having more parameters, they are significantly faster than counterparts ResNet-18 and ResNet-34, and also are more accurate. TVN models tend to have fewer parameters in general than other contemporary models, in addition to being much faster (FIG. 4, top sub-figure).

Another interesting finding is that the popular non-local layer is rarely preferred in Tiny Video Architectures. This suggests that it is more cost-efficient to spend computation on deeper and/or wider networks with larger inputs. Another finding is that layers such as context gating are commonly used, which are significantly cheaper than the non-local layer, but still capture some similar global-attention features.

Example Scaling of Learned Architectures

Another aspect of the present disclosure is directed to techniques for scaling of the learned architectures. For example, scaling the learned architectures can include increasing spatial resolution, increasing the width (number of filters in each layer), and/or increasing the depth (number of times each block is repeated). For example, these can be scaled by multiplying by 2 or 4. Scaling resolution and width lead to the most performance gains. Scaled TVN models can achieve comparable performance to much larger models, while still being very efficient.

Example Time-Constrained Networks

In another example, the search process can be performed by constraining the runtime of the architecture, but not constraining the number of parameters of the architecture. In this time-constrained-but-not-size-constrained scenario, example implementations of the proposed search technique generated networks with large number of parameters (e.g., >60M) which still run efficiently. In particular, these large networks take advantage of wide parallel layers rather than deep sequential layers.

Example Devices and Systems

Figure 4A:
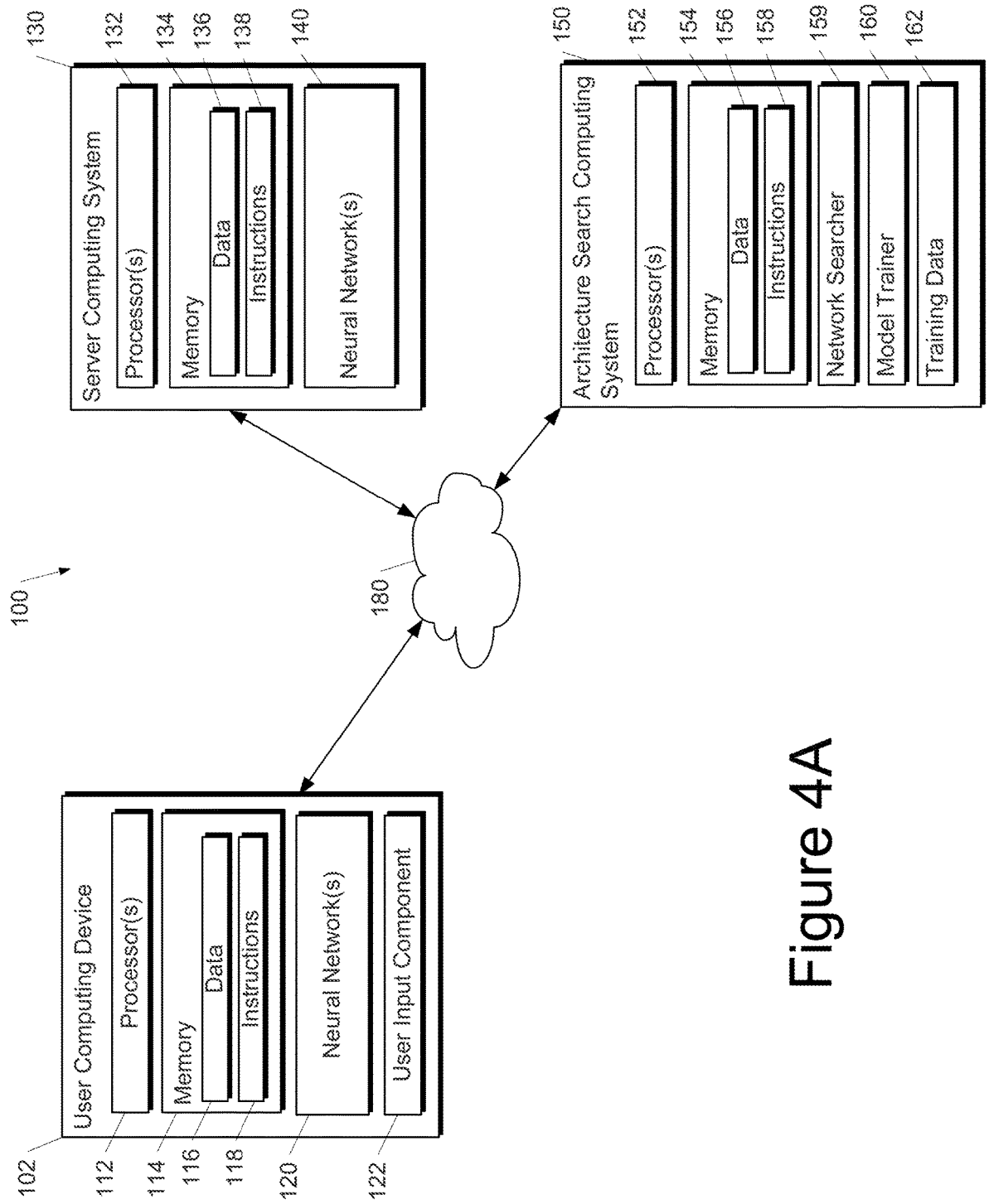
FIG. 4A depicts a block diagram of an example computing system according to example embodiments of the present disclosure.

FIG. 4A depicts a block diagram of an example computing system 100 according to example embodiments of the present disclosure. The system 100 includes a user computing device 102, a server computing system 130, and an architecture search computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more neural networks 120. For example, the neural networks 120 can be or can otherwise include various machine-learned models such feed-forward neural networks, recurrent neural networks (e.g., long short-term memory recurrent neural networks), convolutional neural networks or other forms of neural networks.

In some implementations, the one or more neural networks 120 can be received from the server computing system 130 over network 180, stored in the user computing device memory 114, and then used or otherwise implemented by the one or more processors 112. In some implementations, the user computing device 102 can implement multiple parallel instances of a single neural network 120.

Additionally or alternatively, one or more neural networks 140 can be included in or otherwise stored and implemented by the server computing system 130 that communicates with the user computing device 102 according to a client-server relationship. For example, the neural networks 140 can be implemented by the server computing system 140 as a portion of a web service. Thus, one or more networks 120 can be stored and implemented at the user computing device 102 and/or one or more networks 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned neural networks 140. For example, the neural networks 140 can be or can otherwise include feed forward neural networks, deep neural networks, recurrent neural networks, and convolutional neural networks.

The user computing device 102 and/or the server computing system 130 can train and/or evaluate the networks 120 and/or 140 via interaction with the architecture search computing system 150 that is communicatively coupled over the network 180. The architecture search computing system 150 can be separate from the server computing system 130 or can be a portion of the server computing system 130.

The architecture search computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the architecture search computing system 150 to perform operations. In some implementations, the architecture search computing system 150 includes or is otherwise implemented by one or more server computing devices.

The architecture search computing system 150 can include a model trainer 160 that trains and/or evaluates the machine-learned networks 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the neural networks 120 and/or 140 based on a set of training data 162. In some implementations, if the user has provided consent, the training examples can be provided by the user computing device 102. Thus, in such implementations, the network 120 provided to the user computing device 102 can be trained by the architecture search computing system 150 on user-specific data received from the user computing device 102. In some instances, this process can be referred to as personalizing the model.

The architecture search computing system 150 can also include a network searcher 159. The network searcher 159 can have the components and framework described herein, such as, for example, as illustrated in FIGS. 1A and/or 1B. Thus, for example, the network searcher 159 can include mutation component and/or a controller (e.g., an RNN-based controller) and/or a reward generator. The network searcher 159 can cooperate with the model trainer 160 to train the controller and/or generated architectures. The architecture search computing system 150 can also optionally be communicatively coupled with various other devices (not specifically shown) that measure performance parameters of the generated networks (e.g., mobile phone replicas which replicate mobile phone performance of the networks to evaluate hardware-specific runtimes).

Each of the model trainer 160 and the network searcher 159 can include computer logic utilized to provide desired functionality. Each of the model trainer 160 and the network searcher 159 can be implemented in hardware, firmware, and/or software controlling a general purpose processor. For example, in some implementations, each of the model trainer 160 and the network searcher 159 can include program files stored on a storage device, loaded into a memory and executed by one or more processors. In other implementations, each of the model trainer 160 and the network searcher 159 can include one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 4A illustrates one example computing system that can be used to implement the present disclosure. Other computing systems can be used as well. For example, in some implementations, the user computing device 102 can include the model trainer 160 and the training dataset 162. In such implementations, the networks 120 can be both trained and used locally at the user computing device 102. In some of such implementations, the user computing device 102 can implement the model trainer 160 to personalize the networks 120 based on user-specific data.

Further, although the present disclosure is described with particular reference to neural networks. The systems and methods described herein can be applied to other multi-layer machine-learned model architectures.

Figure 4B:
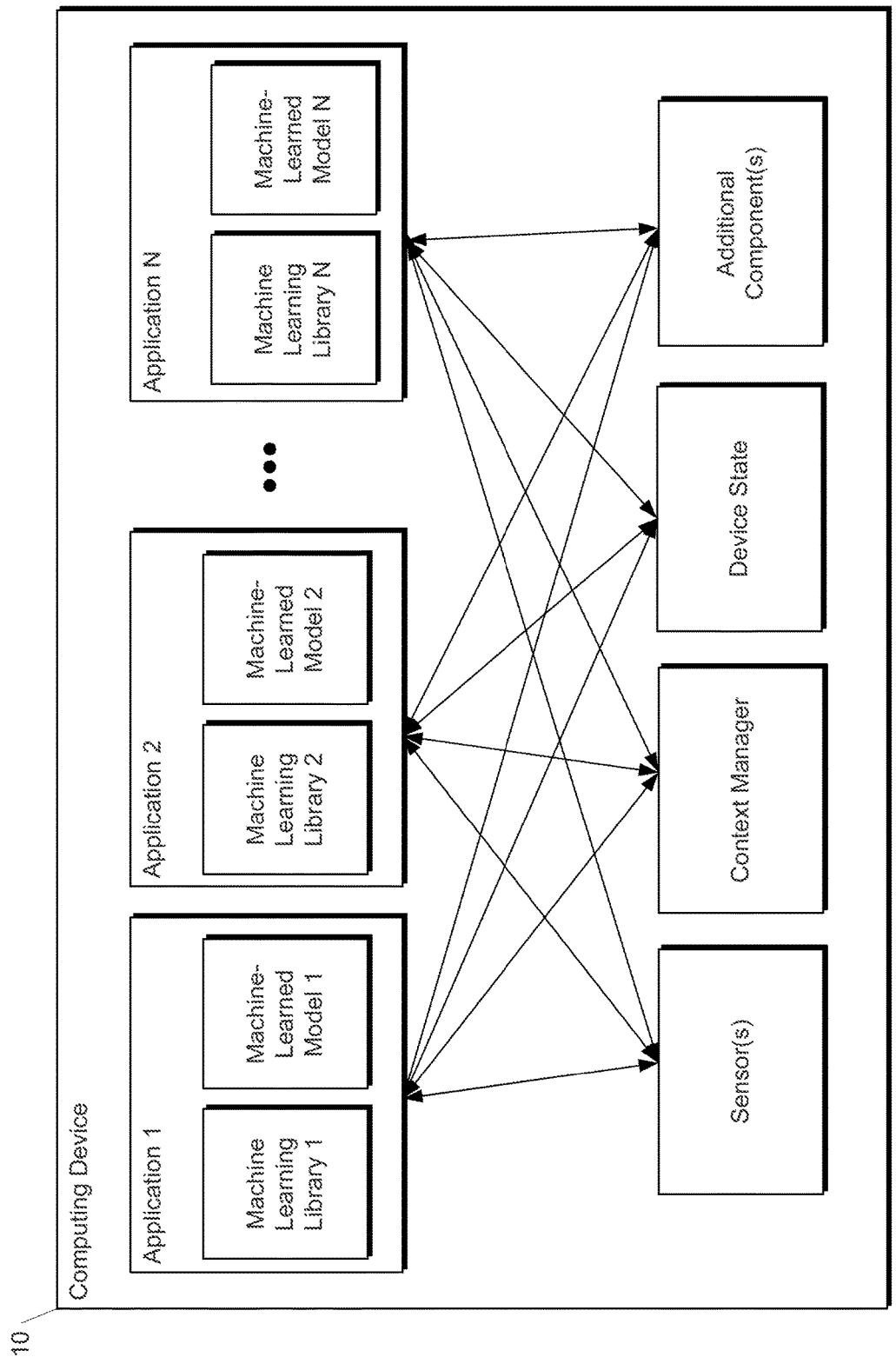
FIG. 4B depicts a block diagram of an example computing device according to example embodiments of the present disclosure.

FIG. 4B depicts a block diagram of an example computing device 10 according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 4B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 4C:
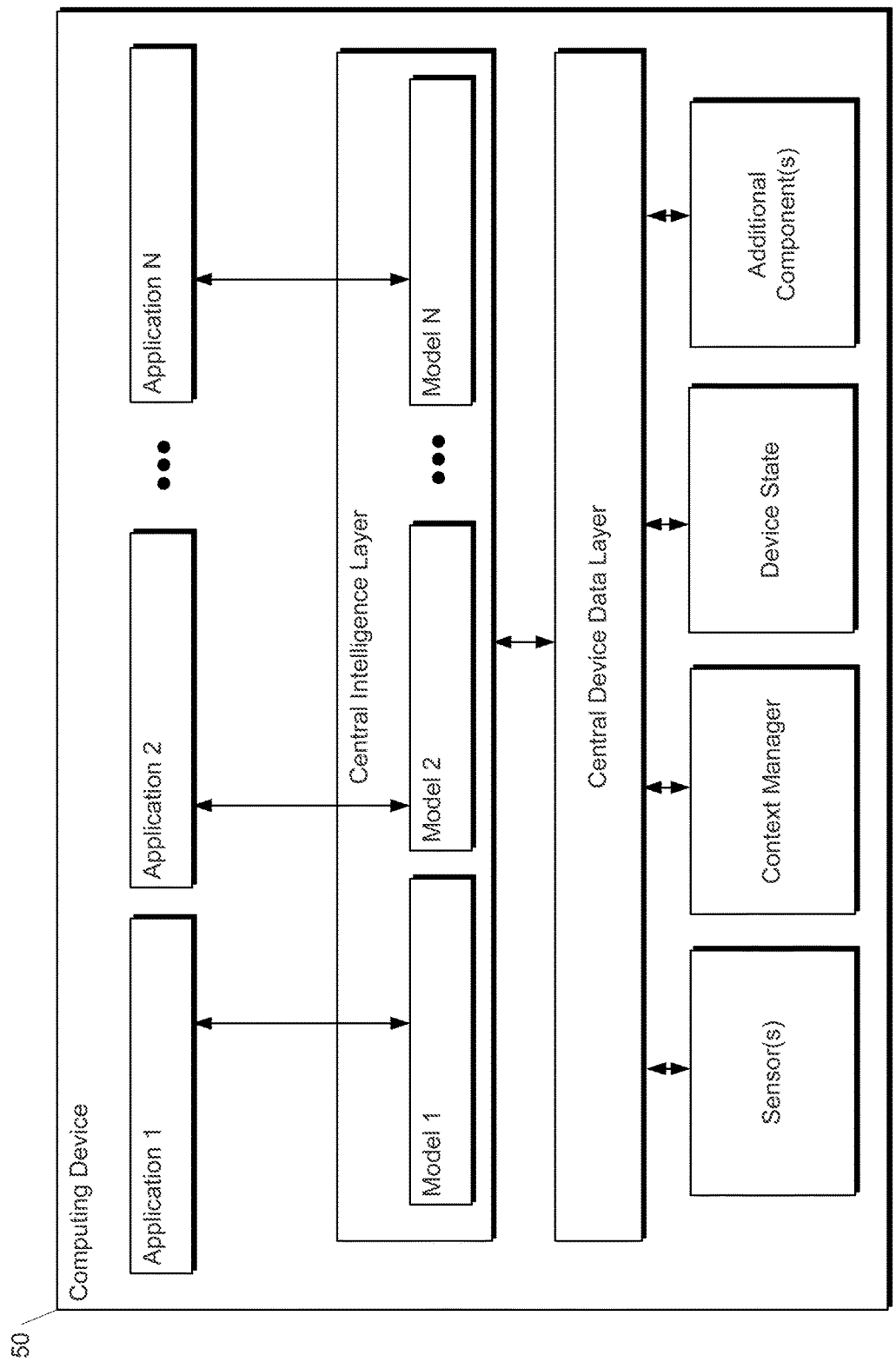
FIG. 4C depicts a block diagram of an example computing device according to example embodiments of the present disclosure.

FIG. 4C depicts a block diagram of an example computing device 50 according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 4C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 4C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method of neural architecture search for video understanding, the method comprising:
   defining, by a computing system comprising one or more computing devices, a plurality of searchable parameters that control an architecture of a video processing neural network, wherein the video processing neural network is configured to process video data to produce inferences;
   for one or more iterations:
      determining, by the computing system, a new set of values for the plurality of searchable parameters to generate a new architecture for the video processing neural network;
      determining, by the computing system, whether the video processing neural network with the new architecture satisfies one or more constraints on a size of the video processing neural network or a runtime of the video processing neural network;
      when the video processing neural network with the new architecture does not satisfy the one or more constraints: discarding, by the computing system, the new architecture prior to completion of training of the video processing neural network with the new architecture; and
      when the video processing neural network with the new architecture satisfies the one or more constraints:
         training, by the computing system, the video processing neural network with the new architecture on a set of video training data; and
         evaluating, by the computing system, one or more performance metrics for the video processing neural network relative to production of inferences for video evaluation data.

2. The computer-implemented method of claim 1, wherein:
   the one or more constraints comprise a runtime constraint that requires that the runtime of video processing neural network with the new architecture does not exceed a threshold runtime.

3. The computer-implemented method of claim 1, wherein:
   the one or more constraints comprise a size constraint that requires that a number of parameters included in the new network architecture does not exceed a threshold number of parameters.

4. The computer-implemented method of claim 1, further comprising, for each iteration:
   when the video processing neural network with the new architecture satisfies the one or more constraints:
      inserting, by the computing system, the new architecture into a population of network architectures; and
      removing, by the computing system, a worst performing architecture, as evaluated by the one or more performance metrics, from the population of network architectures.

5. The computer-implemented method of claim 1, wherein determining, by the computing system, the new set of values for the plurality of searchable parameters to generate the new architecture for the video processing neural network comprises:

obtaining, by the computing system, an existing architecture having an existing set of values for the plurality of searchable parameters; and randomly selecting and mutating, by the computing system, at least one of the existing set of values to generate the new set of values.

6. The computer-implemented method of claim 1, further comprising, for each iteration:

determining, by the computing system, a reward to provide to a controller in a reinforcement learning scheme based at least in part on the one or more performance metrics.

7. The computer-implemented method of claim 6, further comprising, for each iteration:

updating, by the computing system, one or more controller parameters of the controller in the reinforcement learning scheme based on the reward.

8. The computer-implemented method of claim 1, wherein the plurality of searchable parameters comprise an input size of the video data.

9. The computer-implemented method of claim 8, wherein the input size of the video data comprises a spatial resolution of the video data, a number of frames to sample from the video data, or a frame rate of the video data.

10. The computer-implemented method of claim 1, wherein the plurality of searchable parameters comprise a number of blocks included in the architecture.

11. The computer-implemented method of claim 10, wherein the plurality of searchable parameters comprise, for each of the number of blocks, a respective number of layers included in such block.

12. The computer-implemented method of claim 10, wherein the plurality of searchable parameters comprise, for each of the number of blocks, a respective number of repetitions of such block.

13. The computer-implemented method of claim 10, wherein the plurality of searchable parameters comprise, for each of the number of blocks, whether such block includes a skip or residual connection.

14. The computer-implemented method of claim 1, wherein the plurality of searchable parameters comprise a layer type for each of a number of layers.

15. The computer-implemented method of claim 14, wherein the respective layer type for each of the number of layers comprises one of:
- a spatial convolution;
- a temporal convolution;
- a non-local layer;
- a context-gating layer; and
- a squeeze-and-excitation layer.

16. The computer-implemented method of claim 15, wherein:

for each non-local layer, the plurality of searchable parameters comprise a bottleneck size or a representation size;

for each squeeze-and-excitation layer, the plurality of searchable parameters comprise a squeeze ratio; or for each spatial or temporal convolution layer, the plurality of searchable parameters comprise one or more of: a kernel size, a stride, a number of filters, and a type of convolution.

17. The computer-implemented method of claim 1, wherein the plurality of searchable parameters comprise a number of parameters to be included in each of a number of layers.

18. The computer-implemented method of claim 1, wherein:

the performance metric comprises an accuracy metric that measures an accuracy of the video processing network at performing a video classification task;

the performance metric comprises an accuracy metric that measures an accuracy of the video processing network at performing a per-frame video classification task;

the performance metric measures an ability of the video processing network to perform a video segmentation task;

the performance metric measures an ability of the video processing network to perform a pixel-level video segmentation task;

the performance metric measures an ability of the video processing network to perform a frame-level video segmentation task;

the performance metric measures an ability of the video processing network to perform an activity recognition task;

the performance metric measures an ability of the video processing network to perform an object detection task; or the performance metric measures an ability of the video processing network to perform per-frame detection task.

19. A computing system for neural architecture search for video understanding, the computing system comprising one or more processors and a non-transitory computer-readable medium that stores instructions that, when executed by the one or more processors, cause the computing system to perform operations, the operations comprising:

defining, by the computing system, a plurality of searchable parameters that control an architecture of a video processing neural network, wherein the video processing neural network is configured to process video data to produce inferences;

for one or more iterations:

determining, by the computing system, a new set of values for the plurality of searchable parameters to generate a new architecture for the video processing neural network;

determining, by the computing system, whether the video processing neural network with the new architecture satisfies one or more constraints on a size of the video processing neural network or a runtime of the video processing neural network;

when the video processing neural network with the new architecture does not satisfy the one or more constraints: discarding, by the computing system, the new architecture prior to completion of training of the video processing neural network with the new architecture; and when the video processing neural network with the new architecture satisfies the one or more constraints:

training, by the computing system, the video processing neural network with the new architecture on a set of video training data; and evaluating, by the computing system, one or more performance metrics for the video processing neural network relative to production of inferences for video evaluation data.

* * * * *